US010469947B2

(12) United States Patent
Yliaho et al.

(10) Patent No.: US 10,469,947 B2
(45) Date of Patent: Nov. 5, 2019

(54) METHOD AND APPARATUS FOR RENDERING AN AUDIO SOURCE HAVING A MODIFIED VIRTUAL POSITION

(71) Applicant: Nokia Technologies Oy, Espoo (FI)

(72) Inventors: Marko Yliaho, Tampere (FI); Jarmo Hiipakka, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/508,516

(22) Filed: Oct. 7, 2014

(65) Prior Publication Data

US 2016/0100253 A1 Apr. 7, 2016

(51) Int. Cl.
*H04R 5/04* (2006.01)
*H04R 5/02* (2006.01)
*G06T 19/00* (2011.01)

(52) U.S. Cl.
CPC ................. *H04R 5/04* (2013.01); *H04R 5/02* (2013.01); *H04R 2420/01* (2013.01); *H04R 2420/03* (2013.01)

(58) Field of Classification Search
CPC ................................. H04S 7/303; H04S 7/304
See application file for complete search history.

(56) References Cited

U.S. PATENT DOCUMENTS 8,243,967 B2 8/2012 Kirkeby et al.
2004/0062401 A1* 4/2004 Davis ...................... H04S 3/002 381/1
2008/0243278 A1* 10/2008 Dalton .................... H04S 7/304 700/94
2011/0299707 A1* 12/2011 Meyer ..................... H04S 7/304 381/310
2013/0064376 A1* 3/2013 Kaburlasos ............. H04S 7/304 381/17
2013/0279706 A1* 10/2013 Marti ...................... G06F 3/165 381/57
2014/0321680 A1* 10/2014 Takahashi .............. H04S 7/304 381/303
2015/0128075 A1* 5/2015 Kempinski ............. G06F 3/012 715/765
2015/0146873 A1* 5/2015 Chabanne ............... H04S 3/008 381/1

FOREIGN PATENT DOCUMENTS

WO WO 2013105413 A1 * 7/2013 ............. H04S 7/304
WO WO 2013168173 A1 * 11/2013 ............. G06F 3/012
WO WO 2013192111 A1 * 12/2013 ............. H04S 3/008

* cited by examiner

*Primary Examiner* — Mark Fischer
(74) *Attorney, Agent, or Firm* — Alston & Bird LLP

(57) ABSTRACT

A method, apparatus and computer program product are provided to cause AN audio source to be modified in a manner consistent with the corresponding video images once the user and/or a display upon which the images are rendered has been tilted. In regards to a method, an initial virtual position of an audio source is determined. The method also includes determining a tilt angle that defines an angle that an apparatus embodying a display for rendering images has been tilted relative to a reference orientation of the apparatus with respect to a user of the apparatus. The method may also include modifying a virtual position of an audio source based upon the tilt angle and an initial virtual position of the audio source. The method may also include causing the audio source to be rendered in accordance with the virtual position as modified.

28 Claims, 7 Drawing Sheets

METHOD AND APPARATUS FOR RENDERING AN AUDIO SOURCE HAVING A MODIFIED VIRTUAL POSITION

TECHNOLOGICAL FIELD

An example embodiment relates generally to rendering an audio source and, more particularly, to rendering an audio source having a modified virtual position.

BACKGROUND

Users commonly consume multimedia content that includes both video images and corresponding audio content. For example, a user may play a video game by concurrently viewing images presented upon a display and listening to the corresponding audio content. Similarly, the user may watch a movie or other video that includes both video images and corresponding audio content. Audio and video content is increasingly consumed by users utilizing their mobile devices. For example, audio and video content may be consumed by smartphones, tablet computers, laptop computers, portable audio and video players, portable video game players, or the like.

While the audio and video content is rendered, the mobile device may be moved relative to the user. For example, a user watching a movie on a tablet computer may tilt the tablet computer in a clockwise direction. The tablet computer generally includes integrated speakers that output the audio corresponding to video images presented upon the display. In response to tilting of the tablet computer, not only is display and the video image presented thereupon tilted, but the speakers that output the audio signals are correspondingly tilted in the same direction and to the same extent. As such, the orientation and trajectory of the audio signals output by the speakers and the images presented upon the display remain consistent with one another.

For example, in an instance in which the video images depict a vehicle moving horizontally from the left to the right across the display, tilting of the tablet computer by 30° in a clockwise direction would cause the images representative of the movement of the vehicle to depict the vehicle moving downwardly and to the right, such as at an angle of −30° relative to horizontal, as a result of the tilting of the tablet computer. The audio content that corresponds to the video images depicting movement of the vehicle would be similarly repositioned as a result of the tilting of the tablet computer and its integrated speakers with the audio content from the speaker(s) on the right side of the tablet computer being output from a lower position than the audio content from the speaker(s) on the left side of the tablet computer. Thus, the audio content remains consistent in orientation and trajectory with the video images following tilting of the tablet computer.

Similarly, video games frequently involve either the intentional or incidental tilting of the video game player. In instances in which the video game player includes integrated speakers, the audio content remains coordinated with the corresponding video images in both orientation and trajectory since both the display that presents the video images and the speakers that output the audio content are tilted in a uniform manner.

In instances in which a user is wearing headphones, however, the audio content is not correspondingly repositioned when the display upon which the corresponding video images are presented is tilted. As such, the audio content may seem somewhat inconsistent in terms of orientation and trajectory to the user as the video images may be presented following tilting of the display so as to no longer be positioned in the same manner as the audio content since the corresponding audio content output by the headphones is not changed in response to tilting of the display. In this regard, even though the integrated speakers of the mobile device do move in correspondence with the display in response to tilting of the mobile device, the audio content is rendered by the headphones and not by the integrated speakers, with the audio content that is rendered by the headphones not having been modified by the tilting of the mobile device and the corresponding repositioning of the video images.

By way of example, in an instance in which the user is watching a movie or playing a video game on a tablet computer, the user may tilt the tablet computer in a clockwise direction. The video images of the movie or video game are correspondingly tilted, also in a clockwise manner, but the audio signals rendered by the headphones worn by the user remain unaffected by the tilting of the tablet computer. As such, video images of a vehicle moving from the left to the right across the display of a tablet computer that has been tilted in a clockwise direction would depict the vehicle moving downwardly and to the right, such as at an angle of −30° relative to horizontal, as a result of the tilting of the tablet computer. However, the audio signals rendered by the headphones will be unaffected by the tilting of the tablet computer such that the audio content rendered by the headphones is still associated with the movement of the vehicle horizontally from the left to the right and not with the reoriented video images in which the vehicle moves downwardly and to the right as a result of the clockwise tilting of the tablet computer. Thus, the audio signals rendered by the headphones may seem inconsistent with the corresponding video images presented by the display of the tablet computer that has been tilted.

BRIEF SUMMARY

A method, apparatus and computer program product are provided in accordance with an example embodiment in order to cause an audio source to be modified in a manner consistent with the corresponding video images once the user and/or a display upon which the images are rendered has been tilted. In this regard, the method, apparatus and computer program product of an example embodiment may provide for modification of the audio source based upon a tilt angle that defines an angle that an apparatus embodying the display for rendering images has been tilted relative to a reference orientation of the apparatus with respect to a user of the apparatus. As such, the method, apparatus and computer program product of an example embodiment permit the audio source and the corresponding images to continue to correspond in orientation and trajectory even in instances in which the audio source is rendered by headphones, or by speakers having height channels, and the display that presents the images has been tilted. Consequently, the method, apparatus and computer program product of an example embodiment may provide for a more enjoyable user experience.

In an example embodiment, a method is provided that includes determining an initial virtual position of an audio source and determining a tilt angle that defines an angle that an apparatus embodying a display for rendering images has been tilted relative to a reference orientation of the apparatus with respect to a user of the apparatus. A method of this example embodiment also includes modifying, with a processor, a virtual position of an audio source based upon the tilt angle and the initial virtual position. For example, the method may modify the virtual position by combining the tilt angle with the initial virtual position of the audio source. The method of this example embodiment also includes causing the audio source to be rendered in accordance with the virtual position as modified. As such, the audio object, such as the trajectory of the audio source, may remain consistent with the corresponding images following introduction of a tilt angle, such as in response to tilting of the display upon which the images will be rendered.

The method of an example embodiment may determine the tilt angle by capturing an image of a user from a vantage point of the display for rendering images and by determining the tilt angle based upon a predefined feature of the user within the image. For example, the predefined feature may include the eyes of the user. The method of an example embodiment may also include modifying a gain of one or more audio channels. In an example embodiment, the method may cause the audio source to be rendered by causing the audio source to be rendered by headphones in accordance with the virtual position as modified. In an alternative embodiment, the method may cause the audio source to be rendered by causing the audio source to be rendered by a plurality of speakers having height channels.

In another example embodiment, an apparatus is provided that includes at least one processor and at least one memory including computer program code with the at least one memory and the computer program code configured to, with the processor, cause the apparatus to determine an initial virtual position of an audio source and to determine a tilt angle in that defines an angle that an apparatus embodying a display for rendering images has been tilted relative to a reference orientation of the apparatus with respect to a user of the apparatus. The at least one memory and the computer program code are also configured to, with the processor, cause the apparatus of this example embodiment to modify a virtual position of an audio source based upon the tilt angle and the initial virtual position. For example, the virtual position may be modified by combining the tilt angle with the initial virtual position of the audio source. The at least one memory and the computer program code are also configured to, with the processor, cause the apparatus of this example embodiment to cause the audio source to be rendered in accordance with the virtual position as modified.

The at least one memory and the computer program code may also be configured to, with the processor, cause the apparatus of an example embodiment to determine the tilt angle by capturing an image of a user from a vantage point of the display for rendering images and by determining the tilt angle based upon a predefined feature of the user within the image. For example, the predefined feature may include the eyes of the user. The at least one memory and the computer program code may also be configured to, with the processor, cause the apparatus of an example embodiment to modify a gain of one or more audio channels. In an example embodiment, the at least one memory and the computer program code may also be configured to, with the processor, cause the apparatus to cause the audio source to be rendered by causing the audio source to be rendered by headphones in accordance with the virtual position as modified. In an alternative embodiment, the at least one memory and the computer program code may also be configured to, with the processor, cause the apparatus to cause the audio source to be rendered by causing the audio source to be rendered by a plurality of speakers having height channels.

In a further example embodiment, a computer program product is provided that includes at least one non-transitory computer-readable storage medium having computer-executable program code portions stored therein with the computer-executable program code portions including program code instructions for determining an initial virtual position of an audio source and for determining a tilt angle in that defines an angle that an apparatus embodying a display for rendering images has been tilted relative to a reference orientation of the apparatus with respect to a user of the apparatus. The computer-executable program code portions of this example embodiment also include program code instructions for modifying a virtual position of an audio source based upon the tilt angle and the initial virtual position. For example, the program code instructions for modifying the virtual position may include program code instructions for combining the tilt angle with the initial virtual position of the audio source. The computer-executable program code portions of this example embodiment also include program code instructions for causing the audio source to be rendered in accordance with the virtual position as modified.

The program code instructions for determining the tilt angle may, in an example embodiment, include program code instructions for capturing an image of a user from a vantage point of the display for rendering images and program code instructions for determining the tilt angle based upon a predefined feature of the user within the image. For example, the predefined feature may include the eyes of the user. The computer-executable program code portions of an example embodiment may also include program code instructions for modifying a gain of one or more audio channels. In an example embodiment, the program code instructions for causing the audio source to be rendered may include program code instructions for causing the audio source to be rendered by headphones in accordance with the virtual position as modified. In an alternative embodiment, the program code instructions for causing the audio source to be rendered may include program code instructions for causing the audio source to be rendered by a plurality of speakers having height channels.

In yet another example embodiment, an apparatus is provided that includes means, such as a processor, for determining an initial virtual position of an audio source and means, such as the processor, for determining a tilt angle in that defines an angle that an apparatus embodying a display for rendering images has been tilted relative to a reference orientation of the apparatus with respect to a user of the apparatus. An apparatus of this example embodiment also includes means, such as the processor, for modifying a virtual position of an audio source based upon the tilt angle and the initial virtual position. For example, the means for modifying the virtual position may include means, such as the processor, for combining the tilt angle with the initial virtual position of the audio source. The apparatus of this example embodiment also includes means, such as the processor, the user interface or the like, for causing the audio source to be rendered in accordance with the virtual position as modified.

BRIEF DESCRIPTION OF THE DRAWINGS

Figure 1:
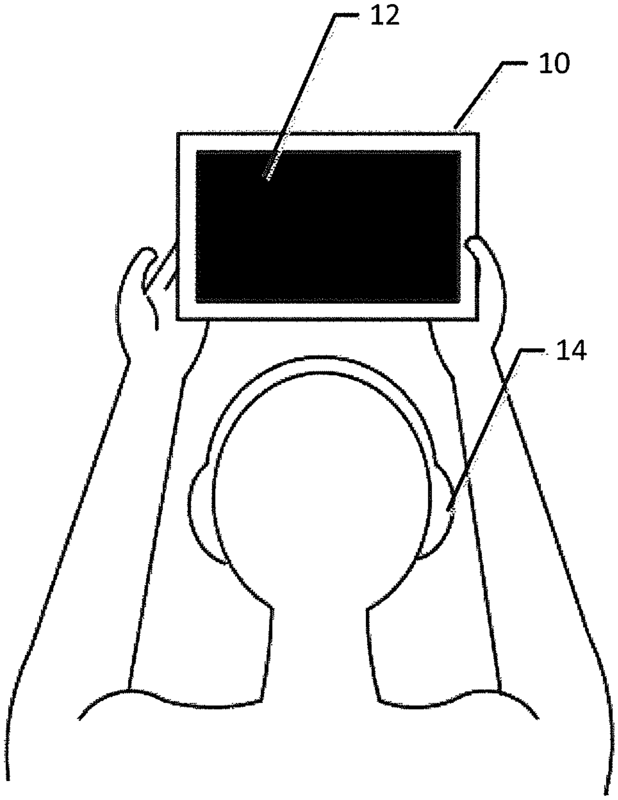
Figure 2:
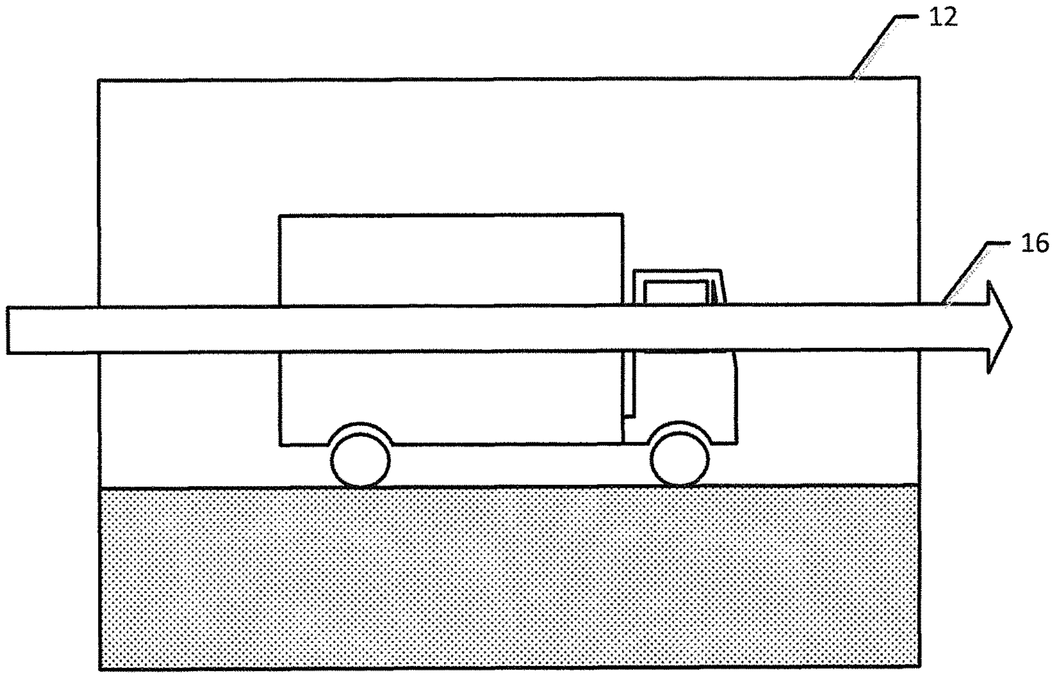
Figure 3:
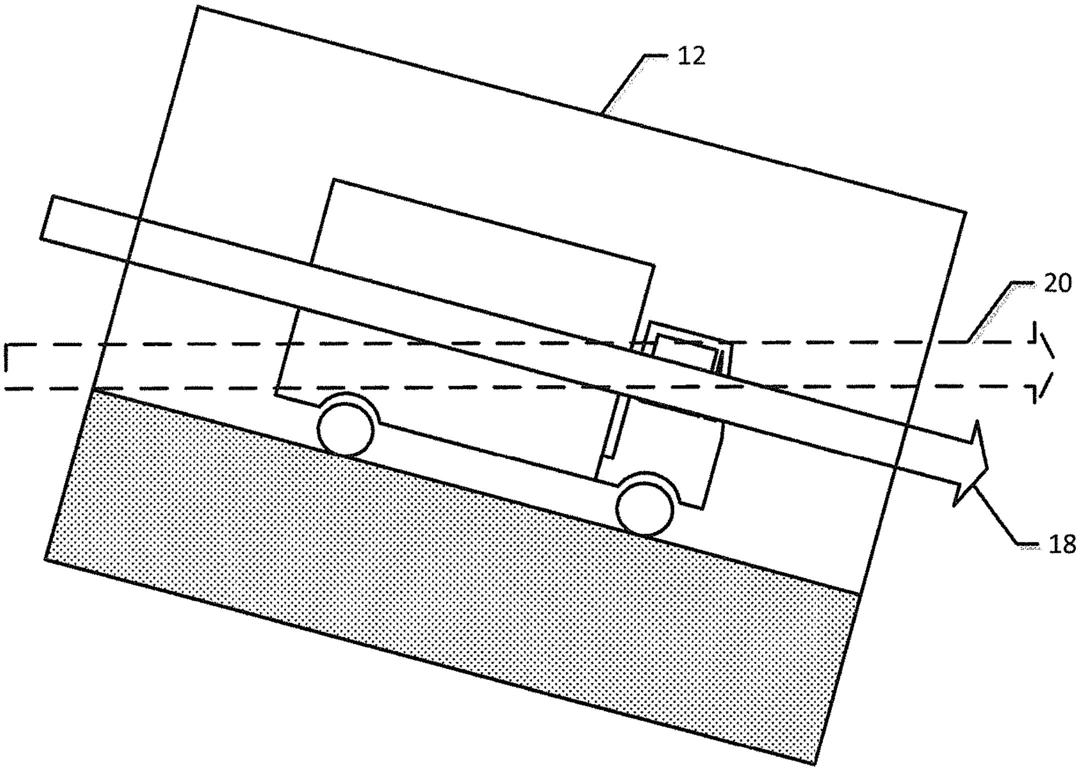
Figure 4:
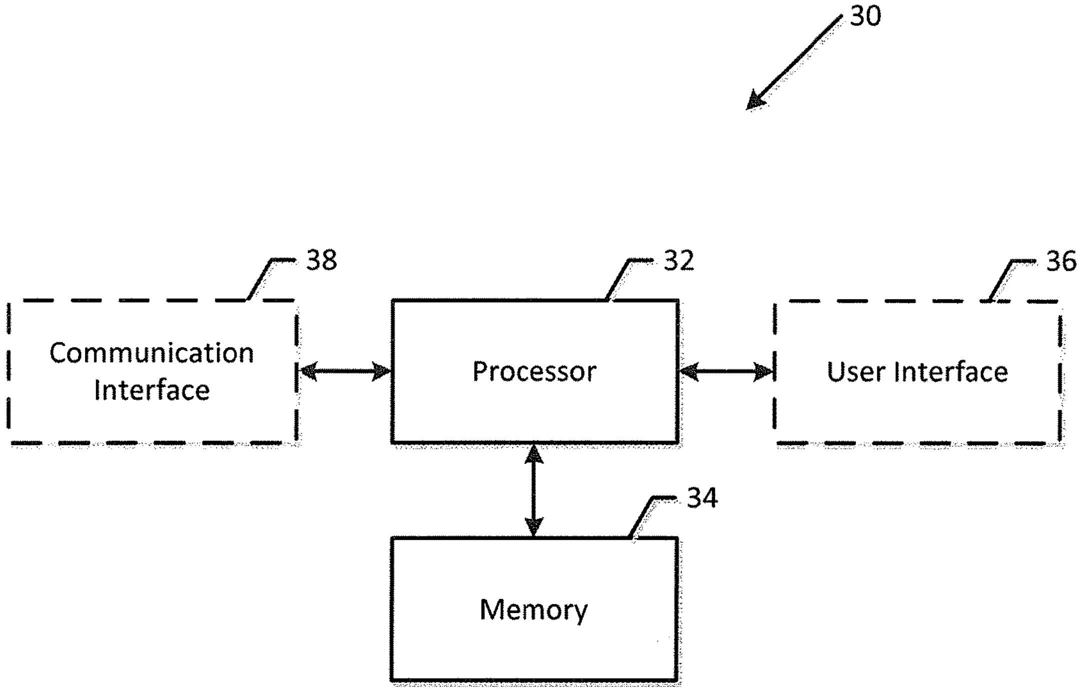
Figure 5:
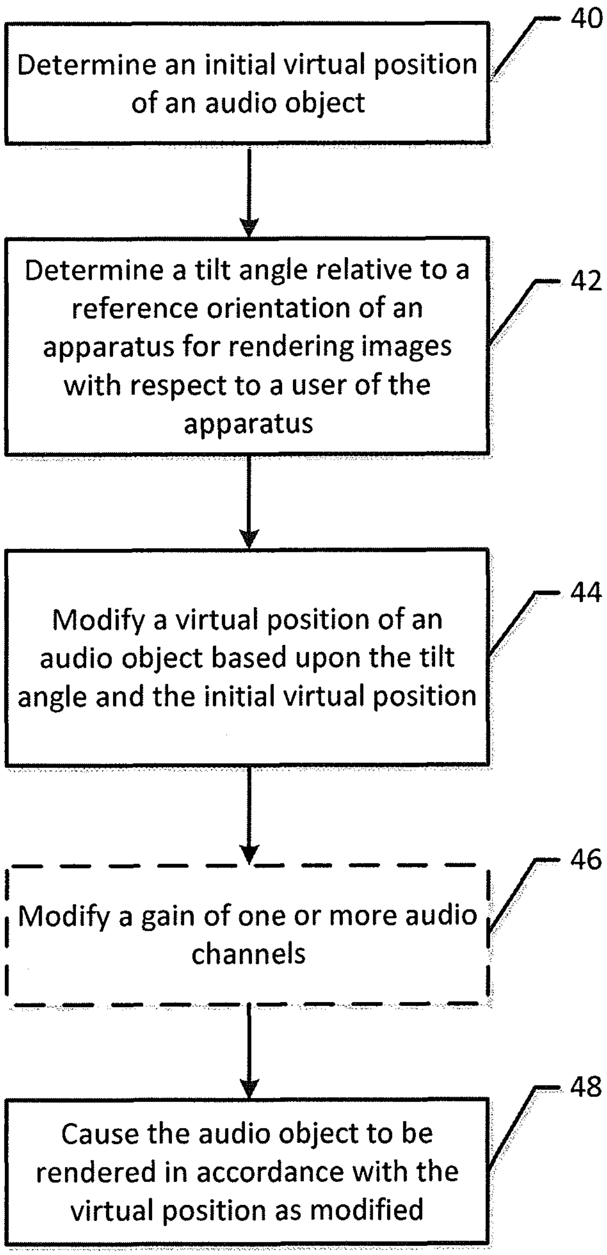
Figure 6:
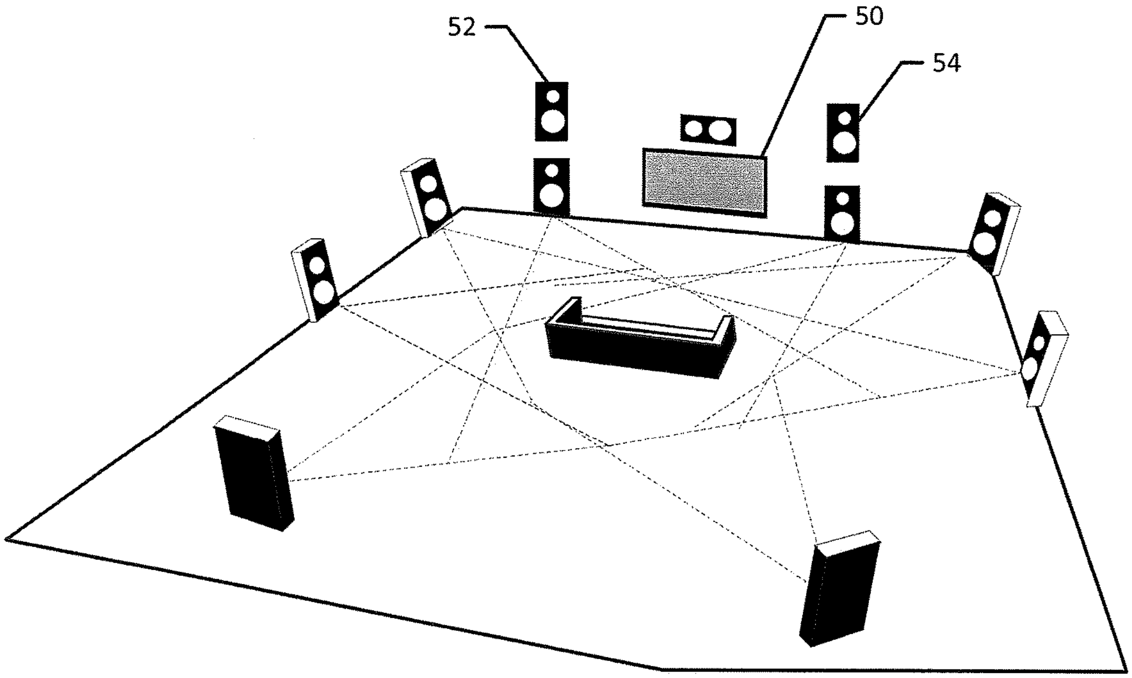
Figure 7A:
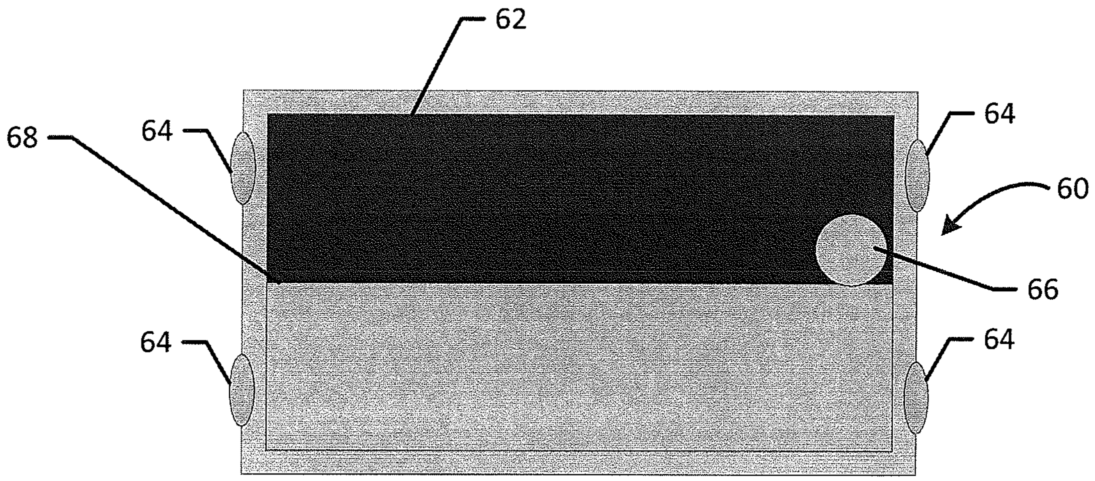
Figure 7B:
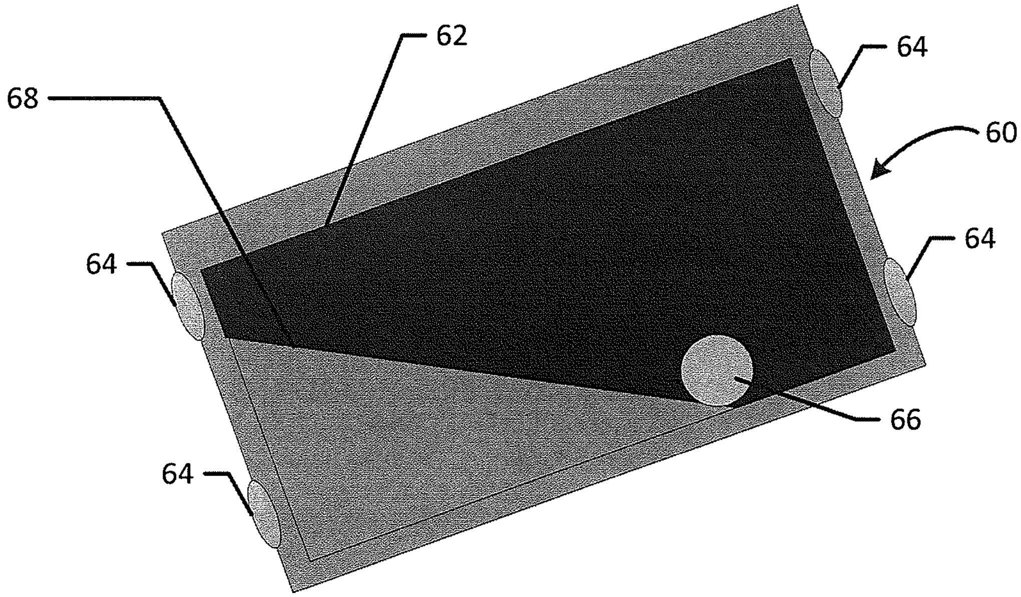

Having thus described certain embodiments of the invention in general terms, reference will now be made to the accompanying drawings, which are not necessarily drawn to scale, and wherein:

FIG. 1 depicts a user holding a tablet computer that presents video images upon a display and renders corresponding audio objects via headphones worn by the user;

FIG. 2 is an image rendered by a display that illustrates the trajectory of the corresponding audio objects;

FIG. 3 is an image rendered by a display that has been tilted that illustrates the trajectory of the corresponding audio objects, both with an unmodified virtual position and with a virtual position that has been modified in accordance with an example embodiment of the present invention;

FIG. 4 is a block diagram of an apparatus that may be specifically configured in accordance with an example embodiment of the present invention;

FIG. 5 is a flowchart illustrating operations performed, such as by the apparatus of FIG. 4, in accordance with an example embodiment of the present invention;

FIG. 6 is a perspective view of a plurality of speakers having height channels via which audio objects having a modified virtual position may be rendered in accordance with an example embodiment of the present invention;

FIG. 7*a* depicts a tablet computer that includes multiple integrated speakers in a reference orientation with respect to a user; and FIG. 7*b* depicts the tablet computer of FIG. 7*a* after having been tilted with the tablet computer configured to render audio objects with a modified virtual position in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, an apparatus 30 and a computer program product are provided in accordance with an example embodiment in order to modify the virtual position of an audio source based upon a tilt angle that defines an angle that an apparatus embodying a display for rendering images has been tilted relative to a reference orientation of the apparatus with respect to a user of the apparatus. As such, the method, apparatus and computer program product of an example embodiment permit the audio source to remain in correspondence with the images even as the display for rendering the images is tilted. In this regard, by modifying the virtual position of an audio source, the method, apparatus and computer program product of an example embodiment provide for the audio source to remain in correspondence with the images rendered by the display that has been tilted in instances in which the audio source are rendered by headphones or by speakers having height channels. Thus, the resulting user experience may be enhanced by maintaining the correspondence in orientation and trajectory between the audio source and the images rendered by a display that has been tilted in accordance with the example embodiment of the present invention.

An audio source represents the perceived origin of audio signals, such as within an audiovisual presentation, and may include one or more waveforms of the audio signal as well as the virtual position of the audio signal as a function of time. As referenced hereinafter by way of example, but not of limitation, an audio source may be embodied by one or more audio objects. In this regard, audio objects typically include at least one waveform that represents the audio object and a virtual position of the audio object as a function of time. Other audio objects may include a plurality of waveforms or may include a link to at least one waveform. When rendered, an audio object is virtualized so that the waveform is output from the virtual position in space. Thus, object-based audio content appears to originate from the virtual position that may correspond with the position within the corresponding image that appears to be the source of the audio content.

By way of example, FIG. 1 depicts the user holding a mobile device 10 having a display 12 for rendering, such as by presenting, images, such as video images. The images may be associated with audio objects that provide the audio content corresponding to the images that are presented. A variety of audiovisual content may include audio objects and corresponding images. For example, some movies may include object-based audio content, such as Dolby Atmos surround sound technology. Additionally, some video games may include three-dimensional (3D) audio that includes object-based audio content.

The mobile device 10 may include integrated speakers. In instances in which the integrated speakers are actuated, such as prior to the user donning headphones 14, the integrated speakers may render the object-based audio content. Since the integrated speakers are embodied by and move in concert with the display that renders the images upon the display 12, both the orientation and the trajectory of the audio content and the images remain in correspondence, even as the mobile device that includes the display is tilted. By way of example, FIG. 2 depicts the display in which video images depicting a vehicle moving horizontally from the left to the right across the display is presented. The display may be defined in terms of an X-Y plane with the x axis extending parallel to the long edges of the display, the y axis extending parallel to the shorter edges of the display and the origin of the X-Y coordinate system being located at the center of the display. The display of FIG. 2 is oriented such that the x axis is horizontal. The audio content rendered by the integrated speakers of the mobile device correspond to the images that are rendered since the audio content is output in a manner that is consistent with the travel of the vehicle from the left to the right across the display. Indeed, as shown by arrow 16, the trajectory of the audio content also moves horizontally from the left to the right across the display.

As the mobile device 10 that includes the display 12 of this example embodiment is handheld, the user may tilt the mobile device and its integral display 12. As shown in FIG. 3, for example, the mobile device, including the display, may be tilted in a clockwise direction such that the x axis defined by the display is no longer horizontal, but is offset by an angular amount, such as −30°, relative to horizontal. Since the integrated speakers of the mobile device are also repositioned in the same manner as the display as a result of the tilting of the mobile device, however, the audio content rendered by the integrated speakers still remains consistent with the images presented by the display. In this regard, following the tilting of the mobile device, the vehicle proceeds across the display at an angle of about −30° relative to horizontal. However, the integrated speakers have also been repositioned so that the audio content output by the integrated speakers has a trajectory that also crosses the display in the same orientation as indicated by arrow 18, such as at an angle of −30° relative to horizontal.

In instances in which the user does not utilize the integrated speakers of the mobile device 10, but, instead, listens to the audio content with headphones 14, the tilting of the display 12 does not, in and of itself, change the audio content that is rendered by the headphones. Instead, the mere tilting of the mobile device, including the display, may cause the images to be repositioned as shown in FIG. 3, but the audio content rendered by headphones would continue to be rendered so as to have a trajectory as shown by arrow 20 consistent with a vehicle moving from the left to the right across the display, that is, consistent with the virtual position of the original audio content, but without taking into account the tilting of the display.

However, the method, apparatus 30 and computer program product of an example embodiment provide for modification of the virtual position of the audio objects based upon the tilt angle that defines an angle that an apparatus, e.g., mobile device 10, embodying a display 12 for rendering images has been tilted relative to a reference orientation of the apparatus with respect to a user of the apparatus. As such, the audio content that is rendered may remain consistent with the images that are rendered following introduction of the tilt angle by appearing to originate from a modified virtual position that corresponds with the images following the tilting, as described hereinbelow. By modifying the virtual position of the audio objects in a manner consistent with the tilt angle, the audio objects may be rendered by headphones 14 or by speakers having height channels in a manner that permits the audio content to remain consistent with the images that are presented following the tilting, such as by following trajectory 18 as shown in FIG. 3.

An apparatus 30 may be specifically configured in order to modify the virtual position of an audio object based upon a tilt angle that defines an angle that an apparatus, e.g., mobile device 10, embodying a display 12 for rendering images has been tilted relative to a reference orientation of the apparatus with respect to a user of the apparatus. As depicted in FIG. 4, the apparatus may be embodied in various manners including by being embodied by the mobile device 10 that includes the display for rendering the corresponding images. Alternatively, the apparatus may be embodied by headphones 14 configured to render the audio objects following modification of their virtual position or by a computing device in communication, such as via wireless or wireline communication, with the display that renders the images and the speakers, such as the headphones or the speakers having height channels, that output the audio objects following modification of their virtual positions.

Regardless of the manner in which the apparatus 30 is embodied, the apparatus may include of an example embodiment is depicted in FIG. 4. The apparatus may include, be associated with or otherwise in communication with a processor 32 and a memory device 34, and optionally a user interface 26 and a communication interface 28, as indicated by the dashed outline. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 30 may be embodied by a computing device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 32 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 32 may be configured to execute instructions stored in the memory device 34 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 30 of an example embodiment may also optionally include or otherwise be in communication with a user interface 36. The user interface may include a touch screen display, a keyboard, a mouse, a joystick or other input/output mechanisms. In some embodiments, the user interface, such as a display 12, speakers, e.g., headphones 14, or the like, may also be configured to provide output to the user. In this example embodiment, the processor 32 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 34, and/or the like).

The apparatus 30 of the illustrated embodiment may also optionally include a communication interface 38 that may be any means such as a device or circuitry embodied in either hardware or a combination of hardware and software that is configured to receive and/or transmit data from/to other electronic devices, such as speakers, e.g., headphones 14, in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

Referring now to block 40 of FIG. 5, the apparatus 30 may include means, such as the processor 32 or the like, for determining an initial virtual position of an audio object. The initial virtual position of the audio object may be defined in various manners. For example, the information associated with an audio object that, among other things, defines the virtual position of the audio object as a function of time which, in turn, serves as the initial virtual position of the audio object. The information associated with an audio object including the virtual position of the audio object as a function of time may be stored by the memory 34 or may be received via the communication interface 38.

As shown in block 42, the apparatus 30 may also include means, such as the processor 32 or the like, for determining a tilt angle that defines an angle that an apparatus, e.g., mobile device 10, embodying the display 12 for rendering images has been tilted relative to a reference orientation of the apparatus with respect to a user of the apparatus. The reference orientation may be defined in various manners and may represent the intended orientation of the display relative to the user. In an instance in which the user is standing or sitting upright, for example, the reference orientation may be defined such that the top and bottom edges of the display extend in a horizontal direction and the left and right edges of the display extend in a vertical direction.

With respect to the tilt angle, the angle that the apparatus, e.g., the mobile device 10, embodying the display 12 has been tilted may include a tilt angle occasioned by tilting of the display relative to a user who has not moved, as well as a tilt angle occasioned by tilting of the user relative to a display that has not moved and a tilt angle occasioned by any differential in the tilting of both the display and the user. The apparatus 30, such as the processor 32, may be configured to determine the tilt angle in various manners. In an example embodiment, however, the apparatus may include means, such as an image capturing device, e.g., a forwardly-facing camera, or the like, for capturing an image of the user from the vantage point of the display for rendering the images. In this regard, the mobile device that includes the display may include a camera or other image capturing device for capturing an image of the user. In instances in which the mobile device also embodies the apparatus, the apparatus may include the image capturing device, such as a camera. Alternatively, in an example embodiment in which the apparatus is separately embodied from the mobile device, the apparatus, such as a communication interface 38, may be configured to receive the image of the user from the image capturing device, such as a camera, from which the tilt angle may be determined as described below or to receive the tilt angle from the mobile device.

In an example embodiment, the apparatus 30 may also include means, such as the processor 32 or the like, for determining the tilt angle based upon a predefined feature of the user within the image, such as the face or ears of the user. In an example embodiment, however, the predefined feature may include the eyes of the user, such as a line drawn through the center point of the eyes of the user. By way of example, the apparatus, such as the processor, may be configured to detect the eyes of the user and, based upon the eyes of the user, determine the tilt angle that defines the angle that an apparatus, e.g., mobile device 10, embodying the display 12 has been tilted relative to a reference orientation of the apparatus with respect to a user of the apparatus, such as a reference orientation in which the longer edges of the display extend horizontally.

In other example embodiments, the tilt angle is not determined based upon an image of the user. For example, the apparatus 30 may include one or more sensors, such as one or more accelerometers and/or gyroscopes, for detecting the orientation of the display and providing data from which the tilt angle may be determined. Alternatively, in an example embodiment in which the apparatus is separately embodied from the mobile device that includes the display, the apparatus, such as a communication interface 38, may be configured to receive the data from one or more sensors carried by the mobile device from which the tilt angle may be determined.

In a further example embodiment, the user may be wearing one or more wearable items, such as ear rings, configured to transmit signals, e.g., electromagnetic radiation or ultrasound signals, from two or more spaced apart locations, such as from the ears on the opposite sides of the user's head. The apparatus 30, such as the communication interface 38, may be configured to receive the signals. The apparatus, such as the processor 32, may be configured to analyze the signals and determine the distance of the wearable items from the apparatus and, in some embodiments, the direction from the apparatus to the wearable items. Based thereupon, the apparatus, such as the processor, may be configured to determine the tilt angle.

In yet another example embodiment, the user may be wearing intelligent eyewear, such as glasses that support virtual reality or augmented reality applications. The intelligent eyewear of this example embodiment may determine the orientation of the mobile device 10 including the display 12 and may provide the apparatus 30, such as via the communication interface 38, with an indication of the tilt angle or information regarding the orientation of the mobile device from which the apparatus, such as the processor 32, may determine the tilt angle.

As shown in block 44 of FIG. 4, the apparatus 30 may include means, such as the processor 32 or the like, for modifying the virtual position of the audio object based upon the tilt angle and the initial virtual position. For example, the apparatus, such as the processor, may be configured to modify the initial virtual position of the audio object, that is, the virtual position of the audio object prior to introduction of the tilt, based upon the tilt angle. In an example embodiment, the apparatus may include means, such as the processor or the like, for combining the tilt angle with the initial virtual position of the audio object. In this regard, the apparatus, such as the image capturing device or like, may have captured an image of the user from the vantage point of the display 12 prior to introduction of the tilt angle. As such, a reference orientation, such as a reference angle, that an apparatus, e.g., mobile device 10, embodying the display may be defined. In this regard, the virtual position of an audio object may be defined relative to the x and y axes so to be located at a point defined by coordinates $x_0,y_0$. The angle $\alpha$ defined by the initial virtual position of the audio object relative to the origin of the coordinate system may be defined as $\alpha=\tan^{-1}(x_0/y_0)$ and the distance z from the origin of the coordinate system to the initial virtual position of the audio object may be defined as $z=\mathrm{sqrt}(x_0^2+y_0^2)$. In an instance in which the display has been tilted by a tilt angle $\theta$, the apparatus, such as the processor, may be configured to determine the modified virtual position of the audio object to be located at a position defined as x',y' in which x' equals $z*\sin(\alpha+\theta)$ and y' equals $z*\cos(\alpha+\theta)$. In this example embodiment, the tilt angle $\theta$ is positive clockwise in that as the display is tilted in a clockwise direction, the audio object correspondingly moves in a clockwise direction as represented by an increase in the tilt angle $\theta$. Conversely, in an instance in which the display is tilted in a counterclockwise direction, the audio object correspondingly moves in a counterclockwise direction as represented by a decrease in the tilt angle $\theta$. As such, based upon the tilting, the apparatus, such as the processor, may be configured to modify the virtual position of the audio object by combining the tilt angle with the initial virtual position of the audio object.

The apparatus 30 of an example embodiment may also include means, such as the processor 32, the user interface 36 or the like, for causing the audio object to be rendered in accordance with the virtual position as modified. See block 48 of FIG. 4. Thus, the audio object may be caused to be rendered, such as by being audibly output, from a location defined by coordinates that have been modified based upon the tilt angle. By way of example and in accordance with the foregoing example embodiment, the audio object that had an initial virtual position at coordinates x,y may be rendered in accordance with a virtual position that has been modified to be x', y'. Thus, the apparatus, such as the processor, of an example embodiment may cause the audio object to be rendered in a manner that remains consistent with the corresponding images that are rendered, e.g., presented, by the display 12 following introduction of the tilt angle that an apparatus, e.g., mobile device 10, embodying the display has been tilted relative to a reference orientation of the apparatus with respect to a user of the apparatus. In regards to the example of FIG. 3, the audio object may have a modified virtual position such that the audio object is rendered in an orientation and with a trajectory that moves with the image of the vehicle following tilting of the display, such as from the upper left to the lower right across the display, as shown by arrow 18.

In an example embodiment, the apparatus 30, such as the processor 32, the user interface 36 or the like, may be configured to cause the audio object to be rendered by causing the audio object to be rendered by headphones 14 in accordance with the virtual position as modified such that the audio object follows the relative tilt angle of the display 12 to the user. Thus, the user wearing the headphones may still hear the audio associated with the images in a manner consistent with the tilting of the display 12 even though the integrated speakers that are also physically tilted with the display do not output the audio signals or do not output the audio signals in a manner that is heard by the user.

In another example embodiment, the apparatus 30, such as the processor 32, the user interface 36 or the like, may be configured to cause the audio object to be rendered by causing the audio object to be rendered by a plurality of speakers having height channels. By way of one example, an audio format, such as a DTS NEO:X surround sound format, may be configured to render audio via a plurality of speakers configured as shown, for example, in FIG. 5. Relative to the display 50, the speakers include a pair of rear speakers, a pair of side speakers, a pair of front side speakers, a pair of front speakers, a center speaker and a pair of front speakers 52, 54 that are elevated relative to the other speakers. In response to images presented by the display, the apparatus 30 may include means, such as the processor 32, the user interface 36 or the like, for processing the audio signals provided by some or all output channels based upon the tilt angle, such as by modifying the channel gains based upon the tilt angle. See block 46 of FIG. 4. In this regard, the display need not necessarily be tilted, but the user may be tilted relative to the display, such as by tilting the user's head relative to the display. Regarding modifying the channel gains, the gain of the height channel of the front speaker on the side of the display that is higher (relative to the opposite side of the display (and relative to the tilt angle)), may be increased with the gain of the main channel on the same side of the display being decreased. Conversely, the gain of the height channel of the front speaker on the side of the display that is lower (relative to the opposite side of the display (and relative to the tilt angle)) may be decreased with the gain of the main channel on the same side of the display being increased.

For example, in response to a −30° tilt angle relative to horizontal in which the left side is higher than the right side, the gain of the left height channel may be increased and the gain in the right height channel may be decreased with the gain of the main channels on the right and left sides being correspondingly decreased and increased, respectively. Conversely, a tilt angle in the counterclockwise direction, such as 30° relative to horizontal, may cause the gain of the left height channel to be decreased and the gain of the right height channel to be increased with the gain of the main channels on the left and right sides being correspondingly increased and decreased, respectively. In an instance in which the user is listening to the speakers without the aid of headphones 14, the speakers may be configured to output the audio signals following modification of the discrete channel gains based upon the tilt angle as described above. Alternatively, in an instance in which the user is utilizing headphones to render the audio objects, the virtual position of the audio objects may also be modified as described above based upon the tilt angle prior to rendering the audio objects in accordance with the virtual positions as modified in the manner described above.

In addition to audio content having a format that has height channels, such as DTS NEO:X surround sound format, audio having other audio formats, such as typical stereo, 2.0, 5.1, 6.1 or 7.1 content, may initially be upmixed to an audio format, such as an 11.1 DTS NEO:X format, that has height channels and may then be processed as described above by adjusting the discrete channel gains based upon the tilt angle and, in instances in which the audio objects are rendered by headphones 14, by further modifying the virtual position of the audio objects as described above. Thus, the resulting audio objects that are rendered in accordance with the virtual positions as modified may continue to correspond with the images rendered by the display 12 following the introduction of a tilt angle defining an angle that an apparatus embodying the display has been tilted relative to a reference orientation of the apparatus with respect to a user of the apparatus. Consequently, the resulting user experience may be enhanced, such as instances in which the user is wearing headphones or in which the audio objects are rendered by speakers having height channels.

In yet another example embodiment, the apparatus 30, such as the processor 32, the user interface 36 or the like, may be configured to cause the audio object to be rendered by causing the audio object to be rendered by a plurality of speakers integrated with the display 12. As shown in FIG. 7A, the user interface of this example embodiment may include multiple speakers on at least one side of the display. For example, the apparatus of this example embodiment may be embodied by a mobile device 60 that includes a display 62 and a pair of speakers 64 on each of a pair of opposed sides of the display. In FIG. 7A, the mobile device is shown to have a reference orientation with the longer sides of the display extending in a horizontal direction. In this example embodiment, an object 66 that is the source of audio signals is depicted to be sitting on a horizon 68 on the right hand side of the display and to be approximately centered in a vertical direction, thereby also defining the initial virtual position of the audio object associated with the object 64. As a result of the initial virtual position of the audio object, while the mobile device is in the reference orientation, audio signals will be predominantly emitted by the speakers on the right hand side of the display with the audio signals split approximately equally between the upper and lower speakers on the right hand side of the display.

In an instance in which the mobile device 60 has been tilted as shown in FIG. 7B, the object 66 remains on the horizon 68 but is now located in the lower right corner of the display 62. After taking into account the tilt angle, the virtual position of the object is modified so as to now also be in the lower right corner of the display. As a result of the modified virtual position of the audio object, while the mobile device remains in the tilted position, audio signals will be predominantly emitted by the speaker 64 proximate the lower right corner of the display with the audio signals emitted by the speaker proximate the upper right corner of the display being reduced relative to the reference orientation of FIG. 7A.

The method, apparatus 30 and computer program product of the example embodiment may be configured to modify all audio objects in the manner described above. Alternatively, the modification of the audio objects in the manner described above so as to take into account both the tilt angle and the initial virtual position may be configurable such that the modification of the audio objects is only performed in response to user input and/or in response to the content that is being visually depicted, the application being executed, etc. In this regard, certain applications and/or certain content may anticipate tilting of the display 12, but may not desire modification of the virtual position of the audio objects, while other applications and/or content do desire such modification of the virtual position of the audio objects. By way of example of an application that does not desire modification of the virtual position of the audio objects, the application executed by a mobile device 10 may be a car racing game in which tilting of the display functions to provide the input normally provided via a steering wheel. For example, tilting of the tablet in a counterclockwise direction may cause the car in the car racing game to turn left. In this game, the horizon may remain static, e.g., horizontal, notwithstanding the tilting of the mobile device. In this example, the virtual position of the audio objects is desirably not modified as the audio objects need not rotate with the mobile device. Thus, the method, apparatus and computer program product of an example embodiment may selectively modify the virtual position of the audio objects based upon user input and/or in response to the content that is being visually depicted, the application being executed, etc.

As described above, FIG. 5 illustrates a flowchart of an apparatus 30, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 34 of an apparatus employing an embodiment of the present invention and executed by a processor 32 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above and are illustrated by a dashed outline. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

determining whether an application or content that includes an audio source desires that a virtual position of the audio source is modified in response to tilting; and selectively modifying the virtual position of the audio source such that the virtual position of the audio source is modified in response to titling in an instance in which the application or content does desire modification but not in an instance in which the application or content does not desire modification, wherein modifying the virtual position of the audio source comprises:

determining the virtual position of the audio source as a function of time based upon information associated with the audio source, wherein the audio source is embodied as one or more audio objects associated with at least one waveform and the virtual position of the audio source, and wherein determining the virtual position comprises determining the virtual position from information associated with the one or more audio objects that embody the audio source;

determining a tilt angle that defines an angle that an apparatus embodying a display for rendering images has been tilted relative to a reference orientation of the apparatus, wherein determining the tilt angle comprises determining the tilt angle based upon data provided by one or more sensors that detect an orientation of the display, and wherein the tilt angle includes an angle that the apparatus embodying the display has been physically tilted;

modifying, with a processor, the virtual position of the audio source based upon the tilt angle and the virtual position of the audio source; and causing the audio source to be rendered in accordance with the virtual position as modified such that the at least one waveform associated with the one or more audio objects that embody the audio source are output with the virtual position as modified.

2. A method according to claim 1 wherein modifying the virtual position comprises combining the tilt angle with the virtual position of the audio source that is based upon information associated with the audio source.

3. A method according to claim 1 wherein determining the tilt angle further comprises:

capturing an image of a user from a vantage point of the display for rendering images; and determining the tilt angle based upon a predefined feature of the user within the image.

4. A method according to claim 3 wherein the predefined feature comprises eyes of the user.

5. A method according to claim 1 wherein modifying the virtual position comprising modifying a gain of one or more audio channels based upon the tilt angle.

6. A method according to claim 1 wherein causing the audio source to be rendered comprises causing the audio source to be rendered by headphones in accordance with the virtual position as modified.

7. A method according to claim 1 wherein the virtual position of the audio source corresponds to a visual object at a position within a corresponding image from which the one or more audio objects that embody the audio source appear to originate, and wherein in an instance in which the visual object moves relative to the display, modifying the virtual position of the audio source comprises modifying the virtual position of the audio source such that the audio source appears to move with the visual object.

8. A method according to claim 1 wherein causing the audio source to be rendered comprises causing the audio source to be rendered by a plurality of speakers having height channels, and wherein modifying the virtual position of the audio source comprises modifying respective channel gains of the height channels of the speakers based upon the tilt angle such that a different height channel of a respective speaker has a different channel gain based upon the tilt angle.

9. A method according to claim 1 wherein modifying the virtual position of the audio source comprises upmixing audio content of the audio source in an audio format that lacks height channels to create audio content of a different audio format having height channels, modifying respective channel gains of the height channels based upon the tilt angle such that different height channels have different channel gains based upon the tilt angle, and combining the virtual position of the audio source with the tilt angle in order to modify the virtual position, and wherein causing the audio source to be rendered comprises causing the audio source to be rendered in accordance with both the virtual position as modified and the height channels having respective gains as modified.

10. A method according to claim 1 wherein modifying the virtual position of the audio source comprises upmixing audio content of the audio source in an audio format that lacks height channels to create audio content of a different audio format having height channels to create audio content of a different audio format having height channels and thereafter modifying respective channel gains of the height channels based upon the tilt angle such that different height channels have different channel gains based upon the tilt angle such that different height channels have different channel gains based upon the tilt angle, and wherein causing the audio source to be rendered comprises causing the audio source to be rendered in accordance with both the virtual position as modified and the height channels having respective gains as modified.

11. An apparatus comprising at least one processor and at least one memory including computer program code, the at least one memory and the computer program code configured to, with the processor, cause the apparatus to at least:

determine whether an application or content that includes an audio source desires that a virtual position of the audio source is modified in response to tilting; and selectively modify the virtual position of the audio source such that the virtual position of the audio source is modified in response to titling in an instance in which the application or content does desire modification but not in an instance in which the application or content does not desire modification, wherein the apparatus being caused to modify the virtual position of the audio source comprises:

determining the virtual position of the audio source as a function of time based upon information associated with the audio source, wherein the audio source is embodied as one or more audio objects associated with at least one waveform and the virtual position of the audio source, and wherein the virtual position is determined from information associated with the one or more audio objects that embody the audio source;

determining a tilt angle that defines an angle that a display for rendering images has been tilted relative to a reference orientation of the display, wherein the tilt angle is determined based upon data provided by one or more sensors that detect an orientation of the display, and wherein the tilt angle includes an angle that the display has been physically tilted;

modifying the virtual position of the audio source based upon the tilt angle and the virtual position of the audio source; and causing the audio source to be rendered in accordance with the virtual position as modified such that the at least one waveform associated with the one or more audio objects that embody the audio source are output with the virtual position as modified.

12. An apparatus according to claim 11 wherein the at least one memory and the computer program code being configured to, with the processor, cause the apparatus to modify the virtual position comprises combining the tilt angle with the virtual position of the audio source that is based upon information associated with the audio source.

13. An apparatus according to claim 11 wherein the at least one memory and the computer program code being further configured to, with the processor, cause the apparatus to determine the tilt angle comprises:

capturing an image of a user from a vantage point of the display for rendering images; and determining the tilt angle based upon a predefined feature of the user within the image.

14. An apparatus according to claim 13 wherein the predefined feature comprises eyes of the user.

15. An apparatus according to claim 11 wherein the at least one memory and the computer program code being configured to, with the processor, cause the apparatus to modify the virtual position comprises modifying a gain of one or more audio channels based upon the tilt angle.

16. An apparatus according to claim 11 wherein the at least one memory and the computer program code being configured to, with the processor, cause the apparatus to cause the audio source to be rendered comprises causing the audio source to be rendered by headphones in accordance with the virtual position as modified.

17. An apparatus according to claim 11 wherein the virtual position of the audio source corresponds to a visual object at a position within a corresponding image from which the one or more audio objects that embody the audio source appear to originate, and wherein in an instance in which the visual object moves relative to the display, the at least one memory and the computer program code being configured to, with the processor, cause the apparatus to modify the virtual position of the audio source comprises modifying the virtual position of the audio source such that the audio source appears to move with the visual object.

18. An apparatus according to claim 11 wherein the at least one memory and the computer program code being configured to, with the processor, cause the apparatus to cause the audio source to be rendered comprises causing the audio source to be rendered by a plurality of speakers having height channels, and wherein the at least one memory and the computer program code being configured to, with the processor, cause the apparatus to modify the virtual position of the audio source comprises modifying respective channel gains of the height channels of the speakers based upon the tilt angle such that a different height channel of a respective speaker has a different channel gain based upon the tilt angle.

19. An apparatus according to claim 11 wherein the at least one memory and the computer program code being configured to, with the processor, cause the apparatus to modify the virtual position of the audio source comprises upmixing audio content of the audio source in an audio format that lacks height channels to create audio content of a different audio format having height channels, modifying respective channel gains of the height channels based upon the tilt angle such that different height channels have different channel gains based upon the tilt angle, and combining the virtual position of the audio source with the tilt angle in order to modify the virtual position, and wherein the at least one memory and the computer program code being configured to, with the processor, cause the apparatus to cause the audio source to be rendered comprises causing the audio source to be rendered in accordance with both the virtual position as modified and the height channels having respective gains as modified.

20. An apparatus according to claim 11 wherein the at least one memory and the computer program code being configured to, with the processor, cause the apparatus to modify the virtual position of the audio source comprises upmixing audio content of the audio source in an audio format that lacks height channels to create audio content of a different audio format having height channels to create audio content of a different audio format having height channels and thereafter modifying respective channel gains of the height channels based upon the tilt angle such that different height channels have different channel gains based upon the tilt angle such that different height channels have different channel gains based upon the tilt angle, and wherein the at least one memory and the computer program code being configured to, with the processor, cause the apparatus to cause the audio source to be rendered comprises causing the audio source to be rendered in accordance with both the virtual position as modified and the height channels having respective gains as modified.

21. A computer program product comprising at least one non-transitory computer-readable storage medium having computer-executable program code portions stored therein, the computer-executable program code portions comprising program code instructions to:

determine whether an application or content that includes an audio source desires that a virtual position of the audio source is modified in response to tilting; and selectively modify the virtual position of the audio source such that the virtual position of the audio source is modified in response to titling in an instance in which the application or content does desire modification but not in an instance in which the application or content does not desire modification, wherein the apparatus being caused to modify the virtual position of the audio source comprises:

determining the virtual position of the audio source as a function of time based upon information associated with the audio source, wherein the audio source is embodied as one or more audio objects associated with at least one waveform and the virtual position of the audio source, and wherein determining the virtual position comprises determining the virtual position from information associated with the one or more audio objects that embody the audio source;

determining a tilt angle that defines an angle that an apparatus embodying a display for rendering images has been tilted relative to a reference orientation of the apparatus, wherein determining the tilt angle comprises determining the tilt angle based upon data provided by one or more sensors that detect an orientation of the display, and wherein the tilt angle includes an angle that the apparatus embodying the display has been physically tilted;

modifying the virtual position of the audio source based upon the tilt angle and the virtual position of the audio source; and causing the audio source to be rendered in accordance with the virtual position as modified such that the at least one waveform associated with the one or more audio objects that embody the audio source are output with the virtual position as modified.

22. A computer program product according to claim 21 wherein the program code instructions for modifying the virtual position comprise program code instructions for combining the tilt angle with the virtual position of the audio source that is based upon information associated with the audio source.

23. A computer program product according to claim 21 wherein the program code instructions for determining the tilt angle further comprise program code instructions for:

capturing an image of a user from a vantage point of the display for rendering images; and determining the tilt angle based upon a predefined feature of the user within the image.

24. A computer program product according to claim 21 wherein the program code instructions comprise program code instructions for modifying a gain of one or more audio channels based upon the tilt angle.

25. A computer program product according to claim 21 wherein the program code instructions for causing the audio source to be rendered comprise program code instructions for causing the audio source to be rendered by headphones in accordance with the virtual position as modified.

26. A computer program code according to claim 21 wherein the program code instructions for causing the audio source to be rendered comprise program code instructions for causing the audio source to be rendered by a plurality of speakers having height channels, and wherein the program code instructions for modifying the virtual position of the audio source comprise program code instructions for modifying respective channel gains of the height channels of the speakers based upon the tilt angle such that a different height channel of a respective speaker has a different channel gain based upon the tilt angle.

27. A computer program code according to claim 21 wherein the program code instructions for modifying the virtual position of the audio source comprise program code instructions for upmixing audio content of the audio source in an audio format that lacks height channels to create audio content of a different audio format having height channels, modifying respective channel gains of the height channels based upon the tilt angle such that different height channels have different channel gains based upon the tilt angle, and combining the virtual position of the audio source with the tilt angle in order to modify the virtual position, and wherein the program code instructions for causing the audio source to be rendered comprise program code instructions for causing the audio source to be rendered in accordance with both the virtual position as modified and the height channels having respective gains as modified.

28. A computer program code according to claim 21 wherein the program code instructions for modifying the virtual position of the audio source comprise program code instructions for upmixing audio content of the audio source in an audio format that lacks height channels to create audio content of a different audio format having height channels to create audio content of a different audio format having height channels and thereafter modifying respective channel gains of the height channels based upon the tilt angle such that different height channels have different channel gains based upon the tilt angle such that different height channels have different channel gains based upon the tilt angle, and wherein the program code instructions for causing the audio source to be rendered comprise program code instructions for causing the audio source to be rendered in accordance with both the virtual position as modified and the height channels having respective gains as modified.

* * * * *